United States Patent [19]

Kapich

[11] Patent Number: 5,125,797
[45] Date of Patent: * Jun. 30, 1992

[54] PORTABLE WATER DRIVEN HIGH VELOCITY FAN

[76] Inventor: Davorin Kapich, 3111 Serrano Dr., Carlsbad, Calif. 92009

[ * ] Notice: The portion of the term of this patent subsequent to May 7, 2008 has been disclaimed.

[21] Appl. No.: 582,143

[22] Filed: Sep. 14, 1990

Related U.S. Application Data

[63] Continuation-in-part of Ser. No. 306,699, Feb. 6, 1989, Pat. No. 5,013,214.

[51] Int. Cl.$^5$ ................................. F01D 9/02
[52] U.S. Cl. ................... 415/202; 415/208.1; 415/211.2
[58] Field of Search ............ 415/202, 220, 208.1, 415/211.2

[56] References Cited

U.S. PATENT DOCUMENTS

| | | | |
|---|---|---|---|
| 1,172,436 | 2/1916 | Coppus | 417/408 |
| 3,066,893 | 12/1962 | Mercier | 415/200 |
| 3,607,779 | 9/1971 | King | 261/24 |
| 4,806,076 | 2/1989 | Andrews | 415/220 |
| 5,013,214 | 5/1991 | Kapich | 415/202 |

*Primary Examiner*—John T. Kwon
*Attorney, Agent, or Firm*—John R. Ross

[57] ABSTRACT

A portable water driven high velocity fan. Contained in a cylindrical housing is a turbine body in which a plurality of cylindrical or part cylindrical and part conical nozzles are provided. The nozzles make an angle of about 10 to 30 degrees with the nozzle outlet surface of the nozzle body. A special air expansion nozzle is provided to permit the fan to generate greatly increased air flow rates, spray a water mist, spray fire fighting foam or spray other similar materials.

6 Claims, 4 Drawing Sheets

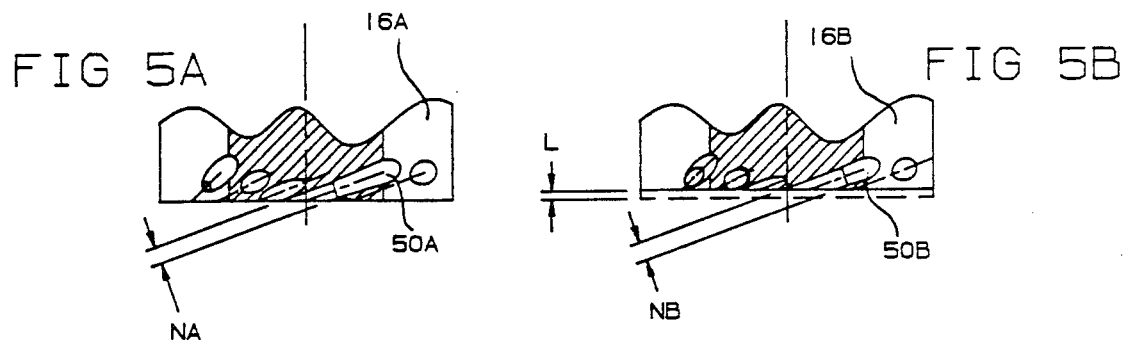
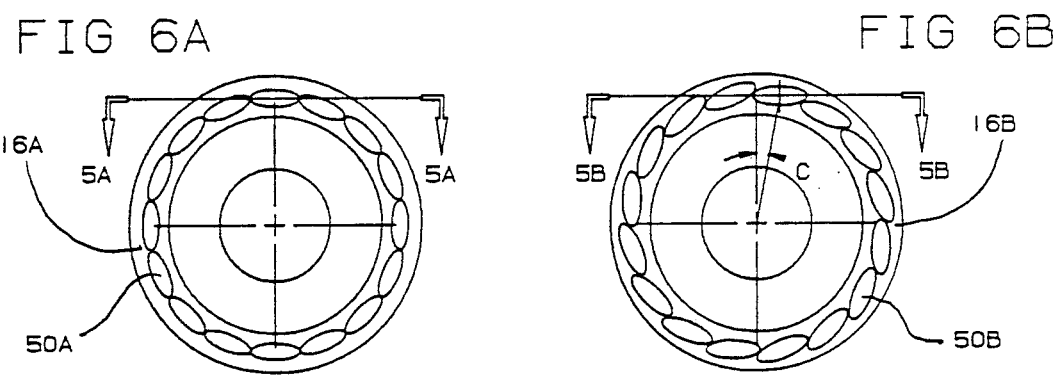
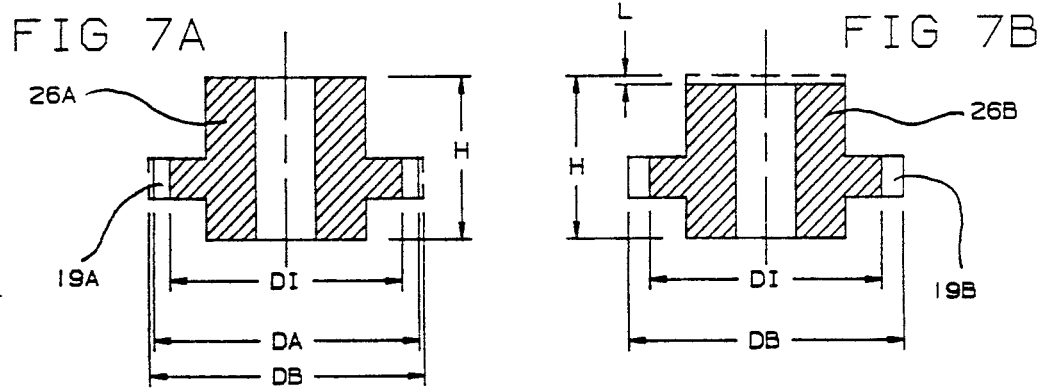

PORTABLE WATER DRIVEN HIGH VELOCITY FAN

BACKGROUND OF THE INVENTION

This application is a continuation in part of patent application Ser. No. 306,699 filed Feb. 6, 1989 now U.S. Pat. No. 5,013,214. This invention relates to water driven fans and in particular to high velocity, high pressure rise fans.

Removal of smoke or other hazardous gases from remote spaces such as encountered during or following a fire in high rise buildings, ships and mine shafts may require that such gases or the fresh air, be transported through long ducts at high gas flow or air flow velocities. Also it is desirable that such high powered fans be light enough to be transportable by a single person in time of emergency. Very often such fans must be capable of operating in either toxic or volatile enviroments and must be explosion proof. Also, in many instances, at the fire locations such as in high rise buildings, the electric power may be lost while the main fire lines are able to deliver water at pressure required for fire fighting. In many cases operation of gasoline driven fans in confined spaces are restricted or prohibited.

The use of water turbines to drive fans is well known to the art. For example, U.S. Pat. No. 3,607,779 by Earle C. King illustrates the use of a radial inflow water turbine at the front end of the shaft driving a relatively low pressure rise axial fan and a foam concentrate pump at the rear end of the shaft. U.S. Pat. No. 4,597,524 by Stig L. Albertsson describes a snow making machine with air flow fan being belt driven by a multistage water turbine. U.S. Pat. No. 3,141,909 by H. A. Mayo, Jr. describes turbine drive for cooling tower fan utilizing an radial outflow water turbine driving a fan.

Radial inflow or outflow turbines require relatively large space envelopes. Such an arrangement is feassible when driving relatively large diameter fans, but when a small diameter, high speed, high pressure rise fan is needed, the radial flow turbine can interfere with the air flow through the fan. Belt driven fans are generally combersome and relatively heavy.

It is an objective of the present invention to provide a water turbine driven fan for which the turbine drive is submerged inside the main airflow stream and furthermore that such turbine drive will not obstruct to any significant degree the usually high velocity airflow associated with such high pressure rise axial fans.

It is a further objective that the turbine envelope be substantially reduced in size below the present state of the art of the fan turbine drives. Such turbine drive should preferably fit well within the envelope of the relatively small hub diameter associated with such high velocity fan impellers. Also, in order to allow for an aerodynamically efficient design of the axial fan diffuser, the rear section of the hub diameter must be further reduced constraining even more the available envelope for the drive turbine. It would be therefore desirable to incorporate a water turbine which is appropriately matched with the fan driving requirements and which will occupy a small envelope while generating relatively large driving power at high hydraulic efficiencies.

It is also an objective of this invention to provide an air expansion nozzle in combination with a high velocity, high pressure rise fan in order to provide a means for (1) generating very substantial increases in the air flow rate, (2) spraying a water mist, (3) spraying fire fighting foam or (4) spraying other simular materials.

SUMMARY OF THE INVENTION

The present invention provides a compact water driven fan comprising an axial bladed impeller driven by an axial flow water turbine wheel both operating on a single shaft and contained in a cylindrical housing. A nozzle body also contained in the cylindrical housing comprises a plurality of nozzles through which water is discharged to impinge on the blades of the turbine wheel which is fully submerged in water. The nozzles are cylindrical or part conical and part cylindrical and the centerline of the nozzles form an angle of about 10 to 30 degrees with the outlet surface of the nozzles body. A manufacturing method is provided which permits the manufacture of fans of various power using the same standard machined parts.

A special air expansion nozzle is provided to permit the fan to (1) generate greatly increased air flow rates, (2) spray a water mist, (3) spray fire fighting foam or (4) spray other simular materials.

BRIEF DESCRIPTION OF THE DRAWINGS

FIG. 5A is a sectional view along the line 5A—5A of FIG. 6A of a nozzle passage for a relatively lower horsepower configuration turbine.

FIG. 6A is a view of the nozzle body for a relatively lower horsepower configuration turbine.

FIG. 7A is a sectional view of the turbine wheel for a relatively lower horsepower configuration turbine.

FIG. 5B is a sectional view along the line 5B—5B of FIG. 6B of a nozzle passage for a relatively higher horsepower configuration turbine.

FIG. 6B is a view of the nozzle body for a relatively higher horsepower configuration turbine.

FIG. 7B is a sectional view of the turbine wheel for a relatively higher horsepower configuration turbine.

DESCRIPTION OF THE PREFERRED EMBODIMENT

Figure 1:
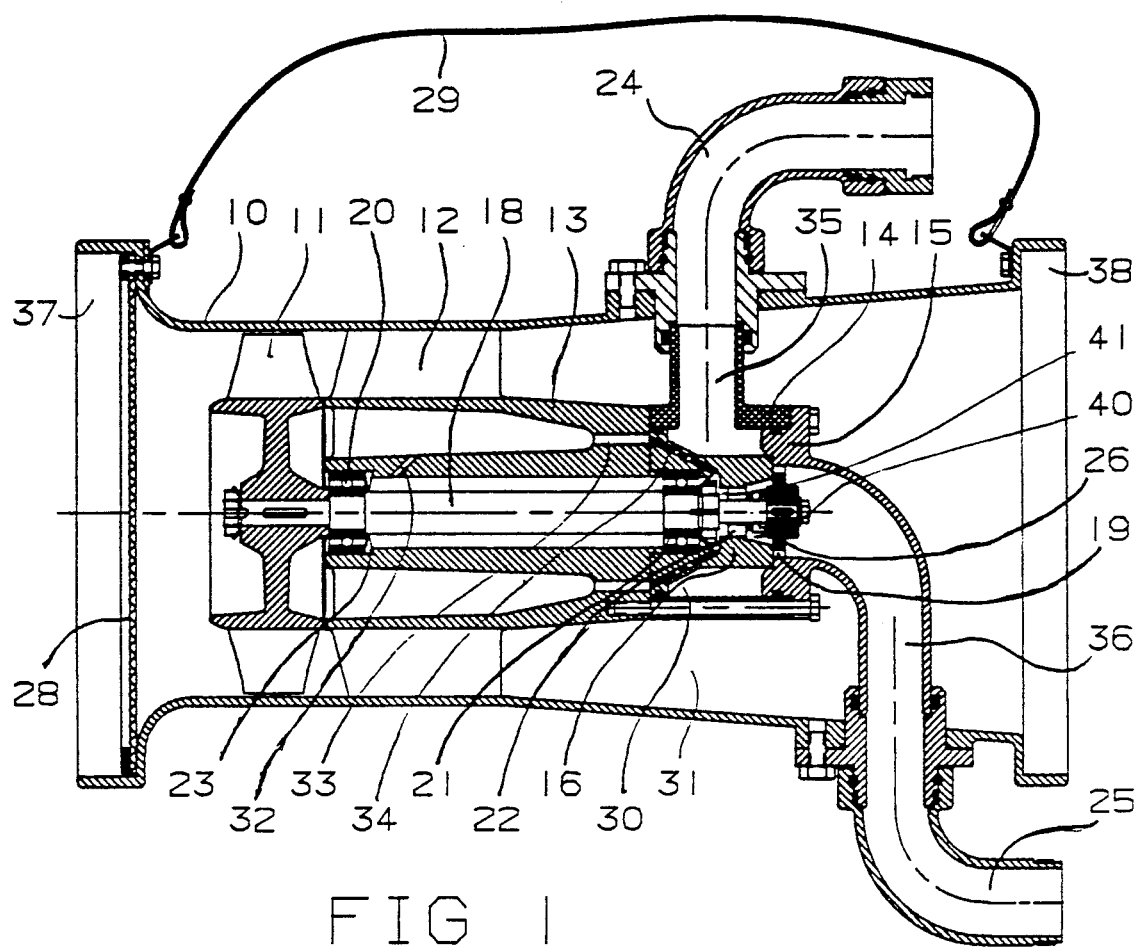
FIG. 1 is a sectional elevation in an axial plane of the fan incorporating the invention.
Figure 2:
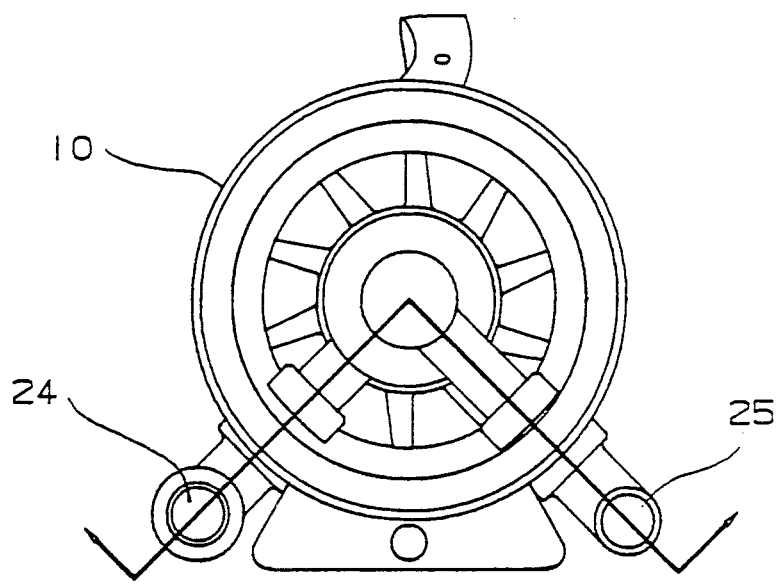
FIG. 2 is a view from the discharge side of the fan incorporating the invention.

The novel water turbine driven fan in its preferred embodiment was extensively tested, providing 1600 cubic feet per minute of air with 14 inches water gage pressure rise, while being driven by a water turbine producing 4 horsepower at 10,000 RPM and having the turbine wheel diameter of only 2.0 inches. The overall weight of the novel fan unit was measured at 44 pounds, thus making it easily transportable by a single person.

With particular reference to FIGS. 1, 2, 3 and 4, a water turbine driven fan incorporating the principle of the present invention is generally indicated by the reference numeral 8. Such fan 8 includes tubular fan housing 10 which is solidly connected to the fan center body 13 via multiple fan stator vanes 12. The center body 13 contains prelubricated rolling element bearings 20 while the turbine nozzle body 16 centrally positioned and firmly attached to the center body 13 contains rolling element bearing 21. Said bearings provide for rotatable radial and axial support to the shaft 18 which at its front end supports a firmly attached axial flow bladed impeller 11 and which at its rear end supports a firmly attached axial flow bladed water turbine wheel 26 incorporating turbine blades 19. Since the turbine wheel 26 is water driven, a conventional type sliding shaft seal indicated by numeral 22, is provided, sealing the water filled cavity 40 from the air filled cavity 41 located on the opposite side of the seal 22.

Cooling to the sliding seal 22 is substantially provided by the water which during the turbine operation inevitably circulates through the cavity 40. Cooling to the bearing 21 is provided substantially by the water flow through the turbine inlet cavity 30 while cooling to the bearing 20 is provided mainly by the fan air flowing through the fan blades 11 and stator vanes 12. Passages 32, 33 and 34 are provided to equalize the air pressure on both sides of bearings 20 and 21 under all fan operating conditions, to minimize even slight air flow through the bearings 20 and 21, which would tend to deplete the quantity of lubricant that has been initialy supplied with the bearings. Axial spring 23 provides for a substantially constant axial load on the front bearing 20 for purpose of constant angular contact between the bearing balls and the races, thus providing for a more central shaft location at all operating conditions.

My 4 horsepower prototype comprises 8 impeller blades 11 utilizing standard NACA series airfoils mounted in accordance with standard design practice. The air flow into the fan enters through the cylindrical flange 37 which is sized to accomodate standard 12 inch or 8 inch diameter flexible ducts. The air flow further passes through the protective screen 28 into the impeller blades 11 which pump the air flow further through stator vanes 12 and into the diffuser section 31. The air flow further passes past the water turbine inlet housing 14, past a cylindrical water turbine inlet passage 35, past the water turbine discharge housing 15, past the water turbine discharge passage 36 and out of the tubular fan housing 10 through the cylindrical flange 38 which is also sized to accomodate standard 12 inch or 8 inch diameter flexible ducts.

The water flow is supplied to the water turbine at a pressure ranging typically from 40 to 180 PSIG into the annular water turbine inlet cavity 30 through the pipe elbow 24 and the turbine inlet passage 35. Pipe elbow 24 may typically be arranged to swivel around in various directions and have provision to be connected to a standard 1.50 inch or 1¾ inch fire hose which is not shown. The annular water turbine inlet cavity 30 supplies the high pressure water to a plurality (twelve in this embodiment) of turbine nozzles configured as round holes with generally varying diameter and positioned appropriately within the nozzles body 16, so as to produce maximum hydraulic efficiency in combination with the turbine wheel blades 19. Such turbine nozzles are identified as numeral 50 in the FIG. 3 and FIG. 4.

Figure 4:
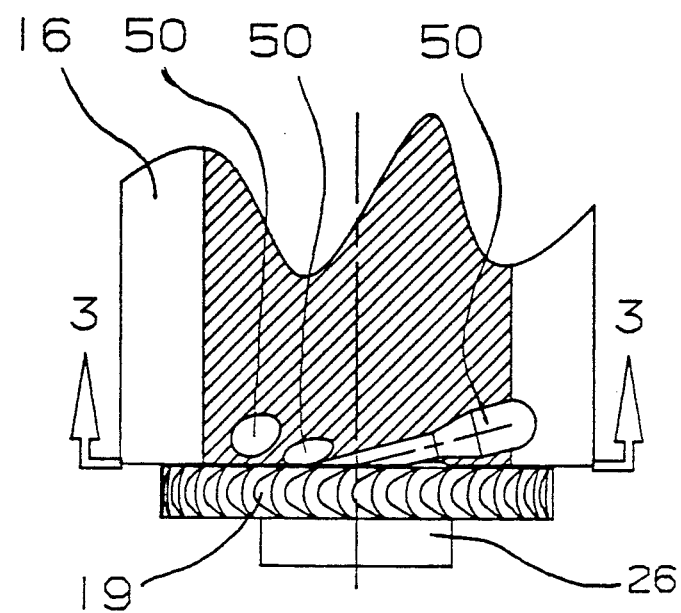
FIG. 4 is a sectional view along the line 4—4 of FIG. 3 showing also the position of turbine blades relative to the nozzle passages.
Figure 3:
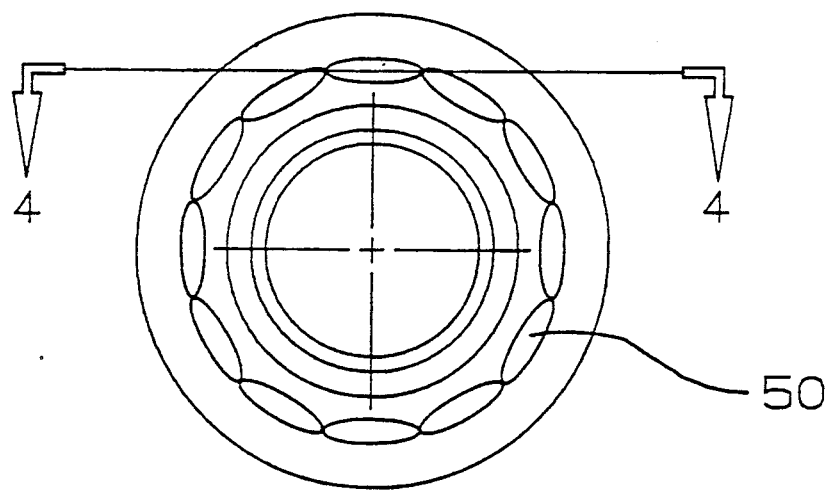
FIG. 3 is a view of the nozzle body incorporating the nozzle passages.

As indicated in FIG. 3 and FIG. 4, the turbine nozzles are drilled at an angle of about 10 to 30 degrees with the plane of the face of the nozzle body outlet surface. In my prototype designed for 2 to 6 horsepower the angle was 15 degrees. At these angles the nozzles form openings in the slope of ovals as shown in FIG. 3 and FIG. 4. The ovals are essentially contiguous in my preferred embodiment where I have twelve nozzles. As shown in FIG. 4 the shape of the perimeter of the nozzles 50 are cylindrical, conical and cylindrical going from the cavity to the outlet surface.

As indicated above a nozzle angle of 15 degrees works well for 2 to 6 horsepower at about 160 PSI turbine inlet pressure and a design speed of about 10,000 RPM. For fans designed for power outputs of less than 2 HP or greater than 6 HP or for substantially different rotational speeds it may be desirable to change the angle slightly using techniques developed for gas turbine design. It is unlikely that the angle would need to be greater than 30 degrees or less than 10 degrees.

FIG. 3 shows the plane view of the exit portion of turbine nozzles 50 as viewed in the plane 3—3 in FIG. 4. The FIG. 4 shows a section through the nozzles body 16 along the plane 4—4 in FIG. 3 and combines such view with the plane view of turbine blades 19 and the turbine wheel 26. The high pressure water is fed from the annular water turbine inlet cavity 30 into the plurality of turbine nozzles 50. The water flow further accelerates through the nozzles 50 converting the pressure energy into the kinetic energy with minimum hydraulic losses.

The high hydrodynamic efficiency of nozzles 50 is attributed to the particular combination of round cross sectioned nozzles 50 and the gradual change in the cross section of the flow area along the centerline axis of the individual nozzles 50. The turbine nozzles 50 are positioned relatively to each other within the nozzles body 16 so as to produce minimum wakes of low velocity fluid in between the passage areas of nozzles 50 and the turbine blades 19. Such wakes are considered to be generally harmful to the turbine hydraulic efficiency. Such nozzles positioning as shown on FIGS. 3, 4, 5A, 6A, 5B and 6B maximizes the percentage of the turbine blades frontal flow area occupied by the high velocity fluid relative to the frontal flow area occupied by the wakes. The relatively high velocity water entering the turbine blades 19 produces work in the blades 19 which are as aforesaid driving the fan impeller 11 via the turbine wheel 26 and the shaft 18. The water flow exits the turbine blades 19 into the passage 36 and into a pipe elbow 25 which may be capable of swiveling around and may be connected to standard size fire hoses in a similar fashion as the inlet pipe elbow 24. Lower power fans could be configured to be connected to standard water hose connections.

A alternate turbine nozzles and turbine wheel configurations, producing significantly higher shaft horsepower and utilizing the same basic turbine hardware as described before is shown on FIGS. 5B, 6B and 7B. The lower horsepower turbine nozzles configuration shown on FIGS. 5A and 6A incorporates nozzle body 16A and individual nozzles 50A having exit diameter indentified as NA on FIG. 5A. The matching lower horsepower turbine wheel and the turbine blades are indentified by a numerals 26A and 19A respectively, on the FIG. 7A. The tip diameter of the lower horsepower turbine blades is indentified as DA on FIG. 7A. The basic turbine blades configuration diameter indentified as DB on FIG. 7A is generally larger than the diameter DA and is being machined down to the diameter DA for a lower power version, while it can remain unchanged for a higher power version such as shown on FIG. 7B. The basic nozzles body utilized for both versions is shown on FIGS. 5A and 6A and it can remain unchanged for the lower power version. For the higher power version the cylindrical portion of the individual nozzles diameter is being increased from the dimension NA shown on FIG. 5A to a dimension NB shown on FIG. 5B while utilizing the same centerlines of the individual nozzles. As described earlier the typical nozzle passage geometry such as shown as 50A on FIG. 5A, consists of tapered hole at the entrance and leading into a cylindrical portion of the nozzle passages closely adjacent to each other at the nozzle exits. Therefore, an increase of individual nozzles diameters in those region will cause interference of those passages and resulting in a breakage between the nozzle walls. To correct this undesirable effect, the nozzle body is machined in the axial direction by the amount shown as dimension L on FIG. 5B. The result of the aforementioned operation will produce closely nested nozzles with larger flow areas such as indicated by the numeral 50B on FIG. 6B. The turbine blades tip diameter indentified as DB on FIG. 7B is sized to match the larger nozzles shown on FIG. 6B. The objective of this design method is to affect minimum changes in the overall turbine and fan configuration, thus the position of bearings and the shaft remain unchanged for both versions. This dictates that the turbine wheel be machined in the axial direction by the dimension L shown on FIG. 7B, in order to compensate for the aforementioned change of the nozzles body shown as dimension L on FIG. 5B. The increase in the nozzle sizes utilizing the aforementioned procedure such as shown on FIG. 6A with smaller nozzles to a FIG. 6B with larger nozzles, changes the outer perimeter of the nozzle exits significantly, thus requiring a change in the matching turbine blades tip diameter from DA shown on FIG. 7A to a diameter DB on FIG. 7B. However, the change of the inner perimeter of the nozzle exits is minimal because of the compound effect of the nozzles centerline spreading further apart from each other tending to increase the inner perimeter of the nozzles, while the increase in the individual nozzles diameter tends to decrease the inner perimeter of the nozzles. For typical high efficiency turbines, the nozzles centerlines are positioned to the shaft centerline with an angle of 60 to 80 degrees (10 to 30 degrees with the turbine nozzle outlet surface) which in combination with an appropriate cone shape of individual nozzles allows for maintaining of relatively constant inner nozzles perimeter utilizing the above described procedure. Therefore, the turbine blades inner diameter shown as DI on FIGS. 7A and 7B which typically is somewhat smaller than the inner perimeter of the nozzles, can remain the same for both versions even if the inner perimeter of the nozzles changes slightly from one version to another. By this method, a relatively simple and inexpensive machining operations allow for utilization of standard premachined turbine nozzles bodies and premachined turbine wheels and blades, thus avoiding a relatively large expense associated with redesigning and retooling of the entire turbine and associated housings.

The higher turbine power output achieved by the above described method is matched by the same increase in power absorbed by the fan. Standard methods, such as slight increase of fan tip diameter or adjustment in fan blade angles or change in number of fan blades can be utilized to produce desired fan performance.

AIR FLOW MULTIPLIER

Figure 8:
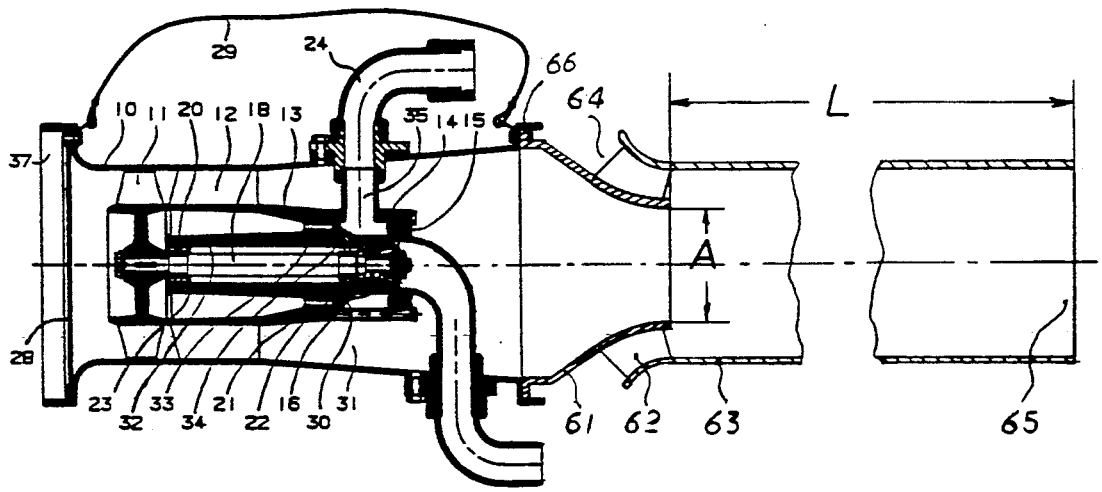
FIG. 8 is a sectional view showing a nozzle for providing greatly increased air flow.

FIG. 8 shows the addition of an air expansion nozzle 61 attached to air discharge flange 66. A plurality of axially positioned vanes 62 provide firm connection between the nozzle 41 and mixing pipe 63.

It is important that nozzle 61 outlet diameter A be selected to properly correspond to the maximum fan efficiency, which by definition corresponds to the maximum net air power output out of the fan. For example, for a water turbine driven fan designed to perform at optimum efficiency while delivering 2000 scfm of air flow with 15 inch water gauge pressure rise, expansion nozzle 61 is preferably designed to expand the air with 15 inch of water gauge pressure drop while continuing the flow of 2000 scfm of air. Calculation of the nozzle 61 diameter A for such a fan is by well known equations as follows:

Expansion adiabatic head across the nozzle:

$$H_{AO} = \frac{K}{K-1} R \cdot T_1 \left[ 1 - \frac{1}{(p_1/p_2)^{\frac{K-1}{K}}} \right]$$

For air, K=1.40; R=53.4; assuming T=70° F.

$$H_{AO} = 99.057 \left[ 1 - \frac{1}{(1.0368)^{.268}} \right] = 1019 \text{ ft}$$

Air velocity at diameter A, $$C = 0.99 \times \sqrt{2g \cdot H} = 253.6 \text{ ft/sec}$$

Nozzle flow area at diameter A, $$\text{Area} = \frac{2000 \text{ cfm}}{60 \times 253.6} = 0.1314 \text{ sq ft}$$

Thus, diameter A=0.409 ft.

For fans with other flow conditions, persons skilled in the art of eductor design may use the technique described above to design other nozzles to provide essentially maximum efficiency while maintaining essentially the same flow which the fan had without the nozzle.

In this manner, the geometric proportion of the expansion nozzle 61 are matched very closely with the maximum fan efficiency and with the maximum net air power output of the fan. Since the fan blading is very closely matched with the water turbine blading design, it can be said that such dimensioning of the nozzle 61 diameter A, will produce a maximum net air power for a given water pressure input into the water turbine where the net air power at the nozzle 61 exit is defined as:

$$\text{Net air power} = \frac{(C^2/2g) \times (\text{cfm}) \times (\text{air density})}{60 \times 550}$$

For the above example, $$\text{Net air power} = \frac{(253.6^2/64.4) \times (2000) \times (0.075)}{60 \times 550} = 4.539 \text{ HP}$$

In this process, the rise in the air pressure generated by the fan impeller blades 11, provides pressurized air at the entrance into the nozzle 61. Expansion of the compressed air in the nozzle 61 converts a large portion of the pressure energy into kinetic energy, i.e. high air velocity at the nozzle 61 exit shown as diameter A on FIG. 8. In accordance with the well known theory of eductors, the high velocity jet of air entrains the secondary air flow entering through the annular area 64. The high velocity jet mixes with the lower velocity secondary air along the length L of the mixing tube 63. The total flow consisting of primary and secondary air exits the mixing tube 63 through the exit 65. The mixing tube 63 length L is 2 to 5 times the nozzle diameter A. My preferred length L is about 4 times A.

MIST GENERATOR

Figure 9:
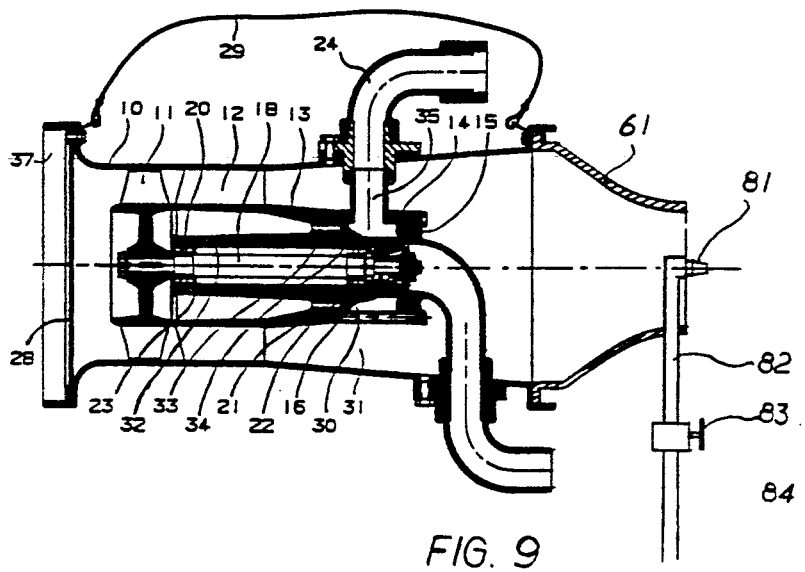
FIG. 9 is a sectional view showing a liquid mist nozzle for adding water or other liquid to the air flow stream.

FIG. 9 shows an embodiment especially adapted for snow making or fire fighting. This system consists of high velocity fan 10, expansion nozzle 61, liquid mist nozzle 81, pipe 82, valve 83 and liquid supply pipe 84. Air expansion nozzle 61 functions in the same manner as in air flow multiplier shown in FIG. 8. The liquid is supplied at relative high pressure via pipe 84 passing through control valve 83, pipe 82 and is expanded through a fog generation nozzle 81 into the high velocity airstream generated in nozzle 61. In this preferred embodiment Beta Corporation liquid fog nozzles were tested with excellent results. Many other spray nozzles could be used.

Fine liquid mist exiting liquid nozzle 81 is accelerated by the high velocity air jet exiting air nozzle 61 and is carried as a plume up to a distance of about 100 feet. This embodiment is useful for fire fighting, for snow making and to prevent freezing of agriculture crops.

FIRE FIGHTING FOAM DELIVERY SYSTEM

Figure 10:
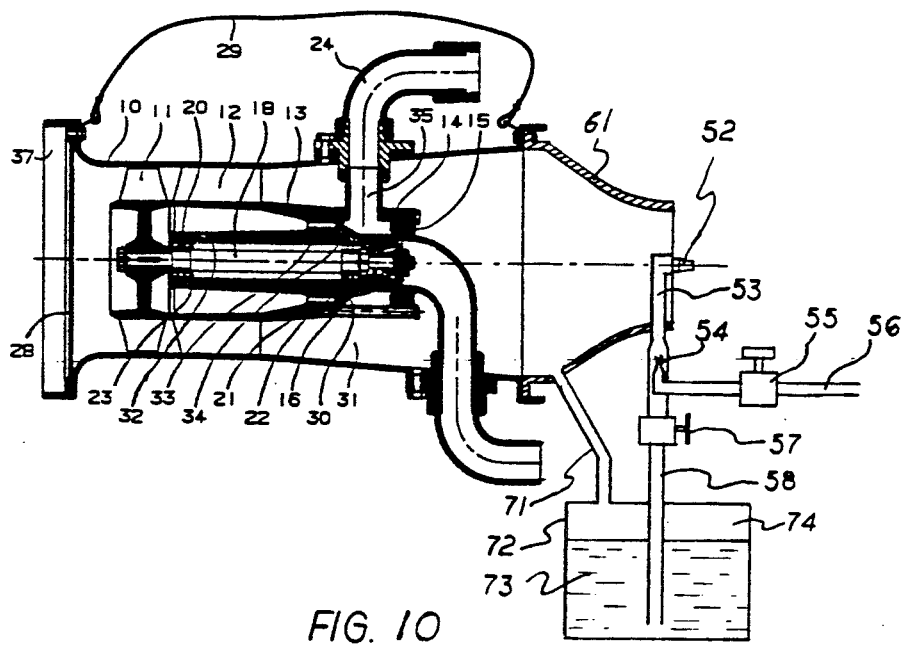
FIG. 10 is a sectional view showing an embodiment for spraying fire fighting foam.

FIG. 10 shows an embodiment of the present invention especially adapted for delivering fire fighting foam into a fire. Air expansion nozzle 61 functions in the same manner as in the embodiments shown in FIGS. 8 and 9. Tank 72, containing fire fighting foam liquid 73, is pressurized by the fan discharge pressure via air pressurizing line 71 and air space 74. The foam liquid is forced upwards through pipe 58 and valve 57. Relatively high pressure water supplied via pipe 56 and valve 55 is expanded in the eductor nozzle 54. By the well known theory oductors, the relatively large flow of water expanded through nozzle 54 is pumping a relatively small flow of liquid foam that is being air pressurized in tank 72 and forced upward through pipe 58 and valve 57 as described above. A mixture of water and foam liquid flows through pipe 53 into nozzle 52 where it is expanded from relatively high pressure to about one atmosphere. The water/foam mixture is discharged from nozzle 52 into the high velocity air jet exiting air nozzle 61 and is accelerated to a high velocity and is carried by the high velocity air to substantial distances allowing firefighters attending the fan to remain at substantial distances from the fire.

It should be understood, that the specific form of the invention illustrated and described herein is intended to be representative only, as certain changes may be made therein without departing from the clear teachings of the disclosure.

Accordingly, reference should be made to the following appended claims in determining the full scope of the invention.

I claim:

1. A water driven fan comprising:
   (a) a generally cylindrically shaped fan housing open at the passage of air at both ends, one of said ends defining an entrance end and the other of said ends defining an exit end;
   (b) at least two shaft bearings;
   (c) a shaft bearing support means contained in said housing and for supporting said at least two bearings;
   (d) a shaft supported by said at least two bearings and defining a shaft axis;
   (e) a water turbine nozzle body defining a water turbine nozzle outlet surface and positioned inside said housing and firmly attached to said housing and comprising a water turbine inlet cavity and a plurality of water nozzles each of said water nozzles providing a passageway for water to pass from said water turbine inlet cavity to said water turbine nozzle outlet surface and defining a water nozzle centerline, where each of said water nozzle centerlines:
      (1) intersects said water turbine nozzle outlet surface at points of intersection on a circle defining a water nozzle exit circle which circle is concentric about said shaft axis and defines a water nozzle exit plane which is perpendicular to said axis and
      (2) forms and angle of about 10 to 30 degrees with said water nozzle exit plane;
   (f) a water inlet means for providing water under pressure to said water cavity;
   (g) an axial flow bladed impeller solidly attached at one end of said shaft;
   (h) an axial flow water turbine wheel solidly attached at the other end of said shaft and fully submerged in water having a plurality of turbine blades, said wheel and blades being positioned adjacent to said water turbine body outlet surface such that water discharged from said water nozzles impinge on said blades and cause said turbine wheel to rotate causing rotation of said impeller to force air or other gasses to flow into said entrance end, flow through said housing and flow out said exit end;
   (i) an air nozzle means defining a small diameter portion attached at said exit end to increase the velocity of the air or other gasses flowing out said exit end.

2. A water driven fan as in claim 1 wherein the diameter of said small diameter portion is selected to permit said fan to perform at maximum efficiency while delivering essentially the same flow of air or other gases as said fan would have delivered without said nozzle.

3. A water driven fan as in claim 1 and further comprising a mixing pipe means attached by a plurality of vanes to said nozzle in order to provide an eductor at the exit end of said housing.

4. A water driven fan as in claim 3 and further comprising a liquid foam source means for adding foam to said spray of liquid.

5. A water driven fan as in claim 5 and further comprising a pressure tube means connecting said nozzle and said foam source means for pressurizing said foam source.

6. A water driven fan as in claim 1 and further comprising a spray means positioned near the small diameter portioin of said air nozzle means for adding a spray of liquid to the flow of air or other gasses through said fan.

* * * * *